United States Patent [19]
Wu

[11] Patent Number: 5,165,772
[45] Date of Patent: Nov. 24, 1992

[54] VISUAL DISPLAY DEVICE

[75] Inventor: Wei-Yu Wu, Calabasas, Calif.

[73] Assignee: Hughes Aircraft Company, Los Angeles, Calif.

[21] Appl. No.: 853,473

[22] Filed: Mar. 18, 1992

[51] Int. Cl.[5] .......................... F21V 7/04; B60Q 1/44
[52] U.S. Cl. ...................................... 362/26; 362/31; 362/80.1; 362/309; 362/339
[58] Field of Search ............... 362/31, 80.1, 309, 307, 362/339, 19, 26

[56] References Cited

U.S. PATENT DOCUMENTS

| | | | |
|---|---|---|---|
| 2,283,598 | 8/1939 | Decalion | 362/309 |
| 2,877,342 | 10/1952 | Beach | 362/309 |
| 5,075,826 | 12/1991 | Lan | 362/31 |

*Primary Examiner*—Ira S. Lazarus
*Assistant Examiner*—L. Heyman
*Attorney, Agent, or Firm*—V. D. Duraiswamy; W. K. Denson-Low

[57] ABSTRACT

A visual display device (10) is especially suited for use as a center-high-mounted stop-light (CHMSL) for an automobile rear window which slants downwardly from the horizontal by a small angle. The device (10) includes a linear light source (12) which preferably emits red light. A display panel (14) has a light receiving edge (14a) extending parallel and adjacent to the light source (12) and first and second opposing surfaces (14b, 14c). The second surface (14b) slants toward the first surface (14c) in a direction away from the edge (14a) and is formed with steps (14d) having walls (14e) which are angled toward the edge (14a) such that the peak output light propagating through the display panel (14) from the edge (14a) is refracted horizontally out of the panel (14). The walls (14e) of the steps (14d) are formed with laterally spaced depressions (14f) for lateral dispersion of light. In addition to use as a CHMSL, the display device (10) can be employed in other applications in which a uniform, linear light source is required.

20 Claims, 4 Drawing Sheets

VISUAL DISPLAY DEVICE

BACKGROUND OF THE INVENTION

1. Cross Reference to Related Application

This application is related to copending U.S. patent application Ser. No. 07/725,216, filed Jun. 26, 1991, which is a continuation of U.S. patent application Ser. No. 07/357,512, filed May 25, 1989, by the present inventor. The related application is entitled "HIGH INTENSITY LIGHT DISPLAY DEVICE".

2. Field of the Invention

The present invention generally relates to visual displays, and more specifically to a visual display device which is especially suitable for automotive center-high-mounted stop-light (CHMSL) and brake light applications.

3. Description of the Related Art

Red colored CHMSLs for automotive vehicles are becoming increasingly popular due to the greatly increased safety margin they provide. In addition to the conventional right and left mounted, red-colored rear brake lights, newer vehicles and retrofit packages for older vehicles are available which include the CHMSL in the form of a third brake light which is mounted near the top of the vehicle rear window. Depression of the vehicle brake pedal causes the CHMSL to be illuminated in combination with the two low mounted brake lights to form a triangle pattern with greatly enhanced visibility and ability to immediately attract the attention of the operator of a trailing vehicle. Statistics have already proven that CHMSLs have prevented numerous traffic accidents in situations requiring emergency braking under high speed, congested traffic conditions.

A major problem which has persisted in providing a CHMSL on a conventional automotive vehicle is that existing devices generally include an opaque housing having a rear-facing translucent red panel with a white illuminating bulb inside the housing which is wired to the vehicle's brake circuit. The opaque housing itself constitutes a safety hazard in that it blocks a portion of the view through the rear window which the vehicle operator must see via the rear-view mirror in order to monitor the proximity of other vehicles. The opaque housing or at least a light blocking member (which may be the reflector) behind the illuminating bulb and red panel is necessary to prevent the vehicle operator from confusing the CHMSL with a light from another vehicle.

Conventional CHMSLs and brake lights including a white bulb, a large and bulky reflector and a red display panel which constitutes a red filter, are inefficient in that only the red component of light from the bulb is transmitted through the panel. All other colors or wavelengths of light are absorbed by the panel and thereby wasted. The result is that the intensity of the red light emitted by the device is considerably lower than the intensity of white light emitted by the bulb.

The above referenced related application discloses a CHMSL including a linear red light source, and a display panel having a first surface formed with optical quality, light reflecting grooves, which reflect and disperse light coupled from the light source into an edge of the display panel out a second surface of the panel which is opposite to the first surface. The display panel viewed from the first surface is transparent at all times. The display panel viewed from the second surface produces a red light pattern reflected from the grooves when the light source is turned on, and appears transparent when the light source is turned off.

Although highly effective in many applications, the CHMSL of the related application is not suitable for mounting on an automobile rear window which is tilted downwardly from the horizontal by a small angle (less than approximately 20°), since the amount of light reflected out through the second surface of the panel in the horizontal direction is unacceptably small.

SUMMARY OF THE INVENTION

A visual display device embodying the present invention is especially suitable for use as a central high mounted stoplight (CHMSL) for an automobile rear window which slants downwardly from the horizontal by a small angle. The device includes a linear light source which preferably emits red light.

A display panel has a light receiving edge extending parallel and adjacent to the light source means and first and second opposing surfaces. The second surface slants toward the first surface in a direction away from the edge and is formed with steps having walls which are angled toward the edge such that the peak output light propagating through the display panel from the edge is refracted horizontally out of the display panel. Although in the basic form of the invention the first surface is flat, the first and/or second surfaces may be made concave to conform to the shape of a curved automobile rear window.

The walls of the steps are tilted or cut back toward the light receiving edge from the vertical by a small angle, which is on the same order as the angle by which the rear window is tilted or slanted downwardly from the horizontal. Thus, substantially all of the light which enters the edge of the display panel is usefully refracted horizontally out of the panel. Thus, the present display device is suitable for mounting as a CHMSL on the top of an automobile rear window with an arbitrarily small downward slant angle.

The walls of the steps are formed with laterally spaced depressions for lateral dispersion of light. Where the linear light source is nearly collimated, the edge of the panel may be made concave to vertically diverge the light beam into the panel. Conversely, where the linear light source is a light emitting diode module or the like which produces a diverging light beam, the edge of the panel may be made convex to converge the light beam into the panel.

The visual display device of the present invention is simple in structure, highly efficient, and inexpensive to manufacture on a commercial production basis. The display panel may conceivably be used individually as an element in other types of display devices. It has been determined experimentally that a display device of the present invention configured as a CHMSL including a suitable light source such as a light emitting diode module or high pressure neon discharge tube provides a red light display having an intensity substantially in excess of federal requirements.

It will be understood that the present display device is not limited to use as a CHMSL, but can be advantageously employed in other applications in which a uniform, linear light source is required.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
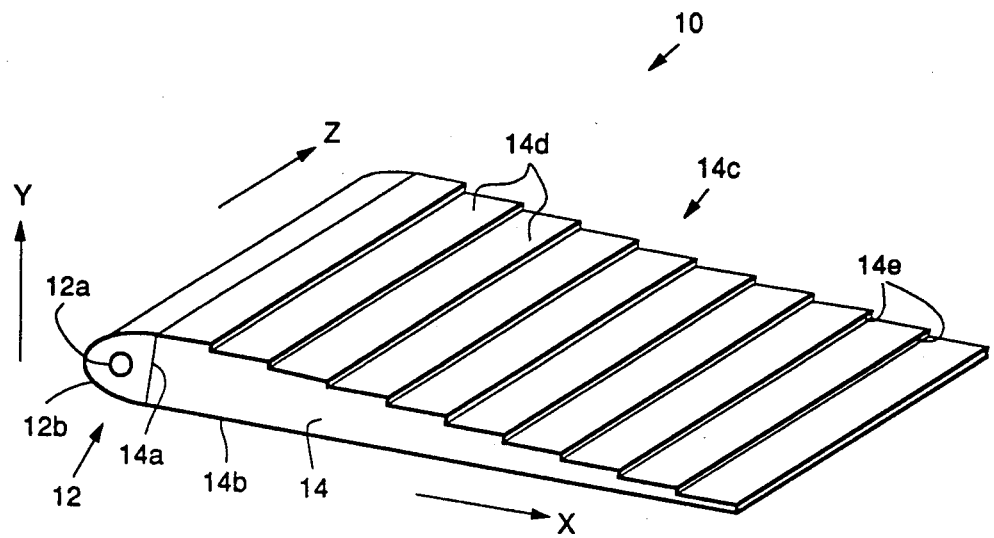
FIG. 1 is a perspective view of a visual display device embodying the present invention.
Figure 2:
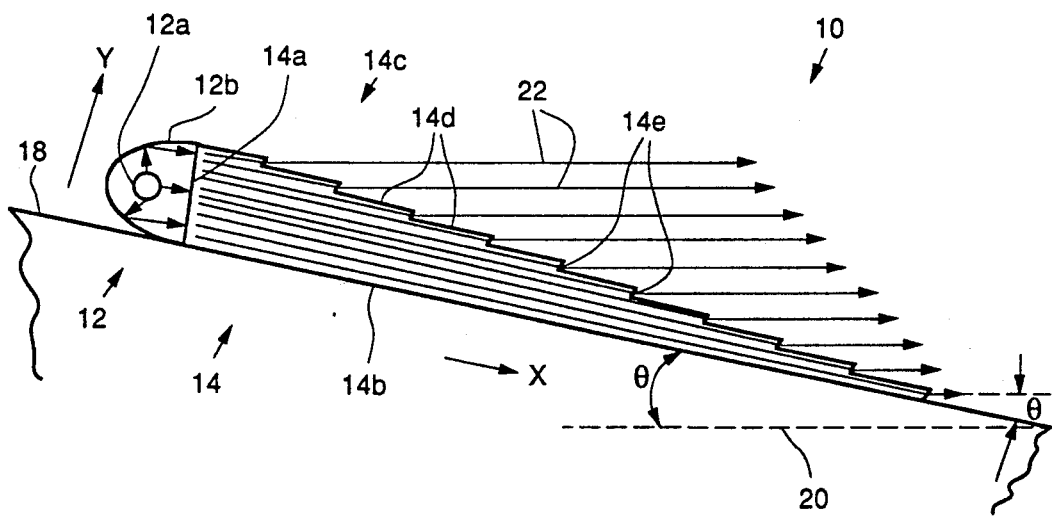
FIG. 2 is a sectional view of the display device.

FIGS. 1 and 2 illustrate a visual display device 10 which may be advantageously employed as a CHMSL and includes a linear light source 12, and a display panel 14 made of a light transmissive material such as glass or acrylic. Further illustrated are orthogonal X-, Y- and Z-axes or directions which are indicated by arrows and lines respectively.

The light source 12 emits a linear light beam which is elongated in the Z-direction, and propagates from the light source 12 into the panel 14 in the X-direction. The light source 12 may include any suitable elements for emitting a linear light beam, such as a laser diode module, light emitting diode module, high pressure neon tubular discharge lamp, fiber optic array, etc. As shown, the light source 12 includes a linear light emitting element 12a, and an optional parabolic reflector 12b which reflects and forms light emitted by the element 12a into a flat beam which enters a light receiving edge 14a of the display panel 14. The reflector 12b is necessary only where the light emitting element 12a is tubular. When the display device 10 is used as a CHMSL, the light source 12 emits red light.

In the basic embodiment of the invention, the edge 14a lies in the Y-Z plane and is perpendicular to a first surface 14b of the panel 14 which lies in the X-Z plane. The panel 14 further has a second surface 14c which opposes and slants or tapers toward the first surface 14b in a direction away from the edge 14a. More specifically, the second surface 14c approaches the first surface 14b in the Y-direction as the distance from the edge 14a in the X-direction increases. The second surface 14c is formed with a plurality of steps 14d having walls 14e which are elongated in the Z-direction. As illustrated more clearly in FIG. 3, the walls 14e are angled or cut back toward the edge 14a by an angle $\alpha_1$.

Figure 3:
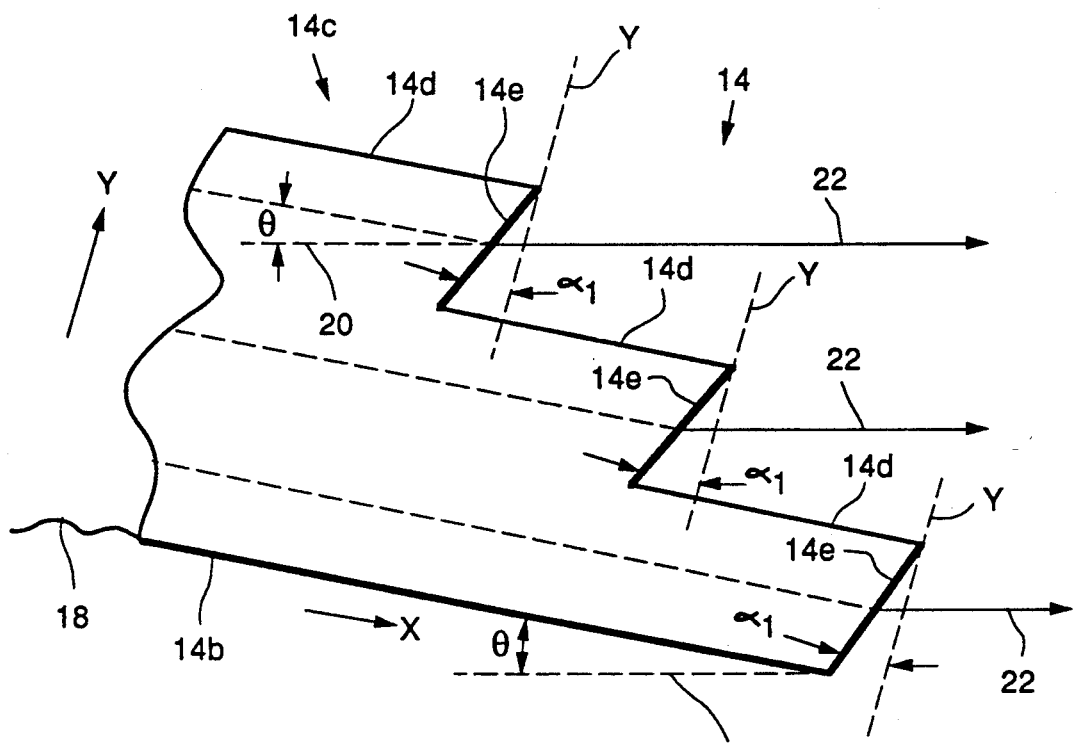
FIG. 3 is a fragmentary sectional view, to enlarged scale, illustrating the operation of the display device.

As viewed in FIGS. 2 and 3, the display device 10 is mounted on a surface 18 which is inclined (or equivalently slanted or tilted downwardly) by an angle $\theta$ relative to the horizontal as indicated by a line 20. The surface 18 is typically the rear window of an automobile, with the first surface 14b of the display panel 14 being flush therewith.

The present display device is not limited to use as a CHMSL, but can be advantageously employed in other applications in which a uniform, linear light source is required. For example, the device 10 can be mounted vertically to illuminate a floor or desk from above. A desk lamp incorporating the device 10 is unique in that the display panel 14 is transparent and will not block the forward view of the user. The device 10 can also be used to illuminate signs at business and other establishments from below. As yet another application, the device 10 can be used as a movable linear spotlight for creating special effects in theatrical and film productions.

Although the device 10 is illustrated as being mounted on top of the surface 18, it is also possible to mount the device 10 on the bottom of the surface 18 using suitable hardware (not shown) with the first surface 14b of the panel 14 parallel to the surface 18. Although not specifically illustrated, a transparent cover or housing made of plastic or the like may be provided over the display device 10 for protection against accumulated dust, scratches, etc.

The light source 12 emits the light beam into the edge 14a of the panel 14 in the X-direction, parallel to the X-Z plane. The beam propagates through the panel 14 and is contained therein by total internal reflection between the surfaces 14b and 14c until it reaches the walls 14e of the steps 14d. In accordance with the invention, the angle $\alpha_1$ of the walls 14e is selected as a predetermined function of $\theta$ and the index of refraction $\eta_1$ of the panel 14 such that the peak output light parallel to the X-direction is refracted out of the panel 14 through the walls 14e horizontally as indicated by arrows 22. This is accomplished by selecting the angle $\alpha_1$ such that the light is refracted out through the walls 14e at the angle $\theta$ away from the first surface 14b.

The light is refracted upwardly by the walls 14e by the same angle $\theta$ by which the first surface 14b is slanted downwardly from the horizontal 20. Thus, substantially all of the light which enters the edge 14a of the display panel 14 parallel to the X-direction is usefully refracted horizontally out of the panel 14. Thus, the present display device 10 is suitable for mounting as a CHMSL on an automobile rear window with an arbitrarily small downward slant angle.

When the light source 12 is not turned on, the panel 14 is transparent when viewed through both surfaces. The panel 14 is transparent when viewed from the first surface 14b under all conditions. When the light source 12 is turned on, the display panel 14 viewed from the second surface 14c produces red light, since the walls 14e appear red due to the light refracted therethrough.

Figure 4:
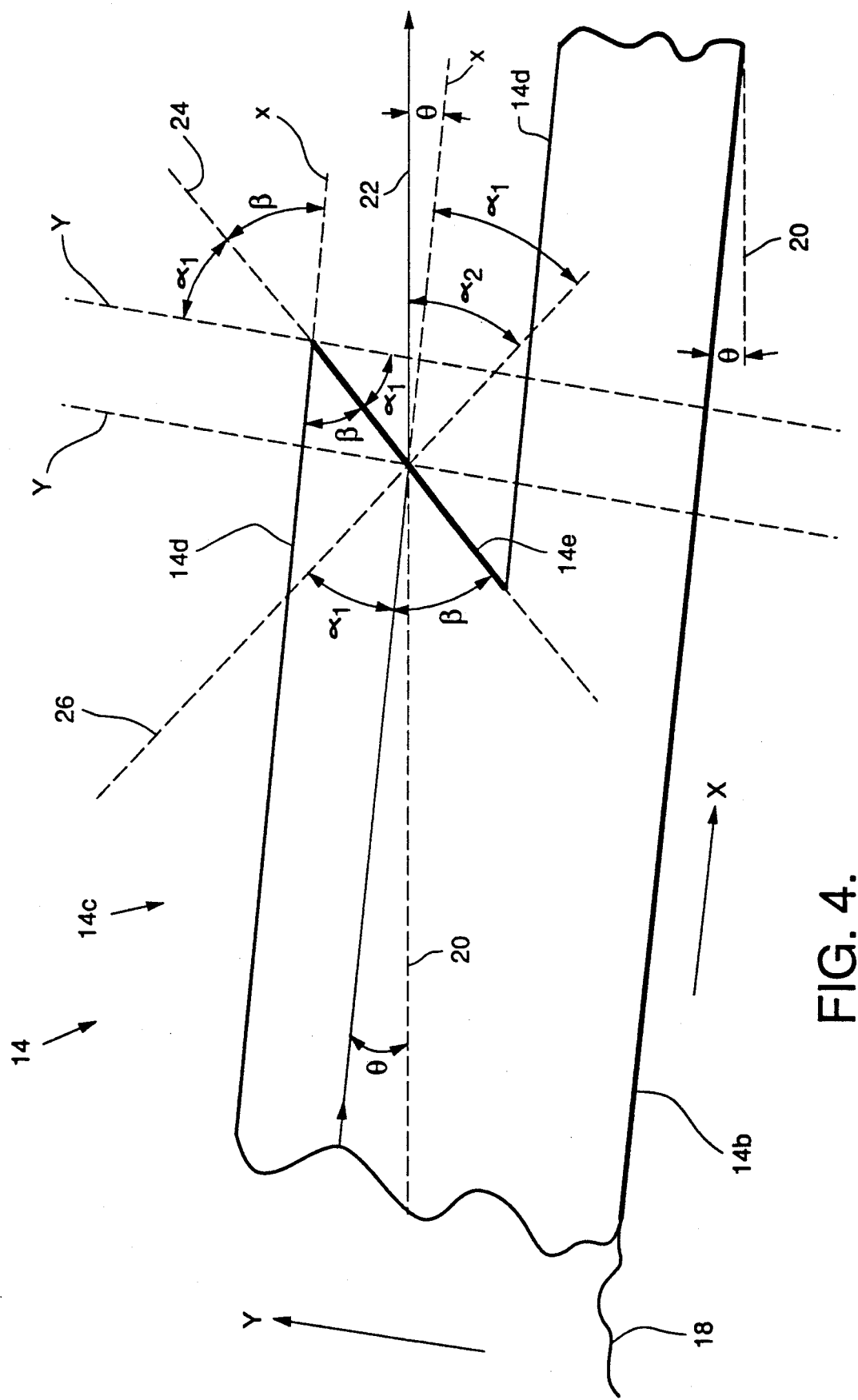
FIG. 4 is a diagram illustrating the geometry of the display device.

The geometry of the display 12 is shown in FIG. 4. The plane of the illustrated wall 14e illustrated in the drawing is indicated by a line 24, whereas the normal to the wall 14e is indicated by a line 26. The angle between the line 24 and the Y-direction is $\alpha_1$, whereas the angle between the line 24 and the X-direction is designated as $\beta$, where $\beta = (90° - \alpha_1)$. Since the lines 24 and 26 are perpendicular, the angles $\alpha_1$ and $\beta$ relative to the line 26 are complementary to their respective relationships to the line 24. More specifically, the angle between the line 26 and the X-direction is $\alpha_1$ whereas the angle between the line 26 and the Y-direction is $\beta$.

The angle $\alpha_1$ between the line 26 and the X-direction is also the angle of incidence of the light beam on the wall 14e. The angle of refraction of the light beam out through the wall 14e is designated as $\alpha_2$. For the light to be refracted out of the display panel 14 through the walls 14e in the horizontal direction 20 as indicated at 22, $\alpha_2 = \alpha_1 + \theta$. By Snell's law, $$\eta_1 \times \sin(\alpha_1) = \eta_2 \times \sin(\alpha_2) = \eta_2 \times \sin(\alpha_1 + \theta)$$

where $\eta_2$ is the index of refraction of air, with $\eta_2 = 1$. Thus, the angle $\alpha_1$ is given as a function of $\theta$ and $\eta_1$ as $$\sin(\alpha_1 + \theta) / \sin(\alpha_1) = \eta_1 \quad \text{(Equ. 1)}$$

(Equ. 1) may be easily solved by iteration using a conventional digital computer. More specifically, the value of $\alpha_1$ is varied until the left side of (Equ. 1) equals the right side thereof.

The display panel 14 described thus far retracts light from a collimated light source out through the walls 14e horizontally, with essentially no lateral dispersion (in the Z-direction). Such a panel would produce a high intensity light display for an observer directly behind the panel, but a display with sharply decreasing intensity as the viewing angle increases. It is therefore desirable to provide means for creating dispersion of reflected light in the lateral direction.

Figure 5:
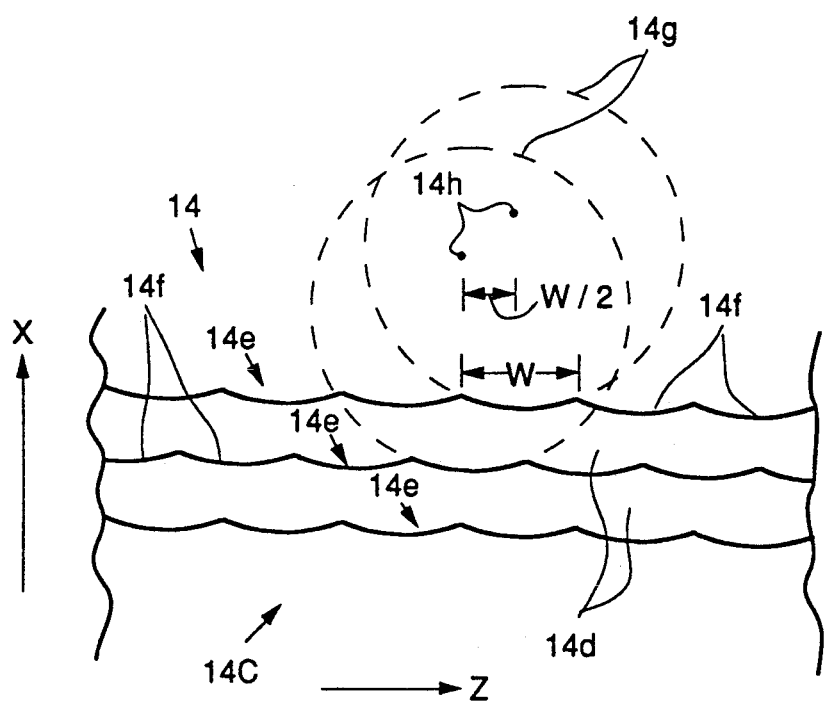
FIG. 5 is a plan view illustrating lateral light dispersing depressions formed in walls of steps of a slanted surface of a display panel of the display device.

As illustrated in FIG. 5, the wall 14e of each step 14d is formed with a series of laterally spaced curved depressions 14f, which provide continuous variation in the lateral angle of the wall 14e and thereby the desired lateral dispersion of light refracted out of the display panel 14 through the walls 14e.

The depressions 14f preferably have a cylindrical cross-section or profile as illustrated, although other shapes such as spherical or elliptical are within the scope of the invention. As viewed in FIG. 5, each depression 14f is defined by a partial cylindrical surface 14g having an axis 14h which extends upwardly from the surface 14c parallel to the plane of the respective wall 14e. In order to provide further dispersion and better appearance, the depressions 14f formed in the walls 14e of alternating adjacent steps 14d are laterally displaced from each other by a distance W/2, where W is the width of each depression 14f.

Figure 6:
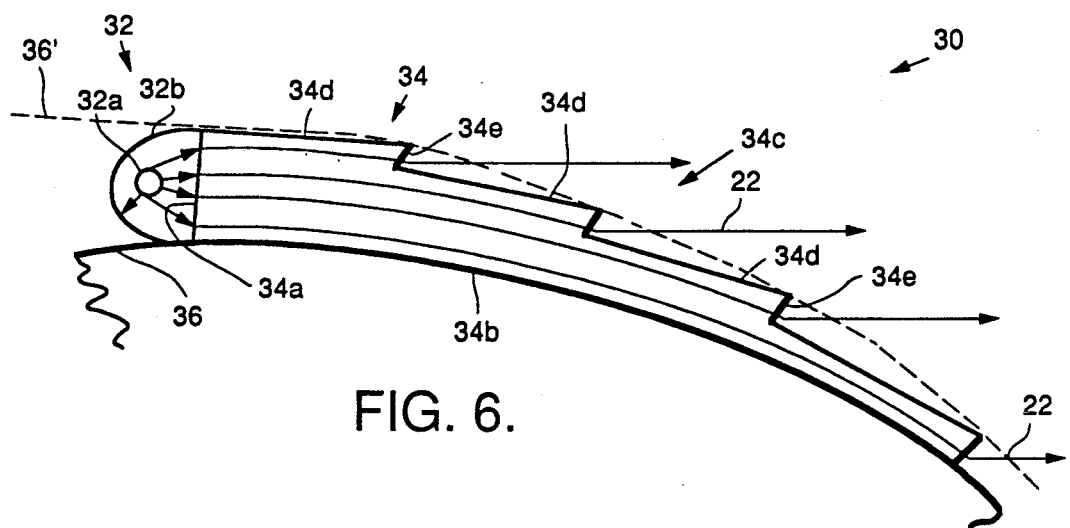
FIG. 6 is a sectional view illustrating a modified display device embodying the present invention having a curved lower or upper mounting surface.

Whereas the surface 14b of the display panel 14 of the display device 10 is flat, it is within the scope of the invention to form the display panel into a curved shape to conform to a surface on which it is mounted. As illustrated in FIG. 6, a display device 30 includes a linear light source 32 and a display panel 34 which is mounted on top of a downwardly curved surface 36 such as an automobile rear window. The display panel 34 has light receiving edge 34a and a curved first surface 34b which is concave about the Z-direction so as to conform to the surface 36. The panel 34 has a second surface 34c formed with steps 34d having walls 34e in an manner similar to the device 10.

Due to the curvature of the panel 34, the angles $\alpha_1$ of the individual walls 34e may differ from each other. However, (Equ. 1) is applicable to calculation of the angle $\alpha_1$ (and the complementary angle $\beta$) for each wall 34e. Although the panel 34 is illustrated as being concave about the Z-axis, it may also or alternatively be curved about the X-axis although not shown in the drawing. It is also within the scope of the invention to mount the display device on the bottom, rather than on top of a downwardly curved surface of an automobile rear window as indicated at 36'.

Figure 7:
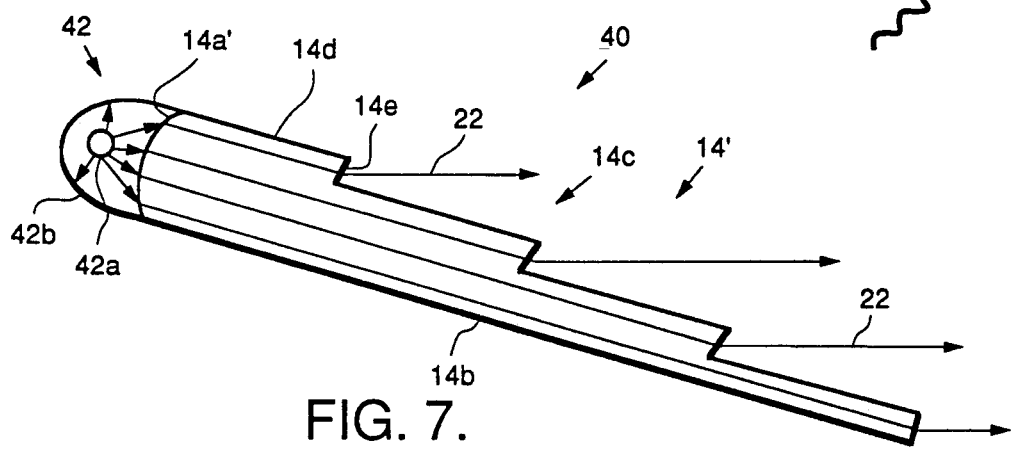
FIG. 7 is a sectional view illustrating a modified display device embodying the present invention including a display panel having a light receiving edge with a convex cross-section.

FIG. 7 illustrates another display device 40 embodying the invention, in which like elements are designated by the same reference numerals used in FIGS. 1 to 4, and similar but modified elements are designated by the same reference numerals primed. The device 40 includes a linear light source 42 having a divergent light emitting element 42a such as a tubular discharge lamp, and a reflector 42b. Most of the light beam from the element 42a does not propagate straight from the light source 42 into a display panel 14', but diverges in the vertical direction.

In order to channel the light into the panel 14' at a smaller aperture, a light receiving edge 14a' is made convex. The edge 14a' thereby functions as a cylindrical converging lens which converges the light into the panel 14'.

Figure 8:
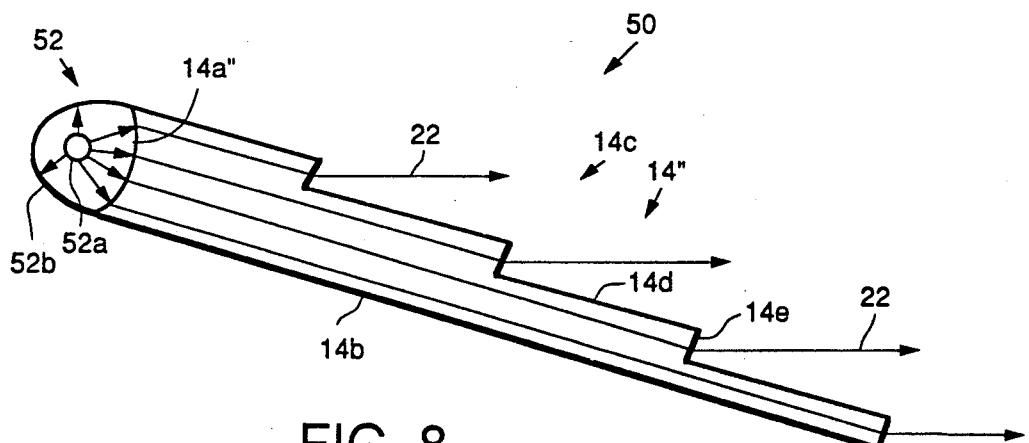
FIG. 8 is a sectional view illustrating a modified display device embodying the present invention including a display panel having a light receiving edge with a concave cross-section.

FIG. 8 illustrates another display device 50 embodying the invention, in which like elements are designated by the same reference numerals used in FIGS. 1 to 4, and similar but modified elements are designated by the same reference numerals double primed. The device 50 includes a linear light source 52 having a collimated light emitting element 52a such as a laser diode module, and a housing 52b. The light beam from the element 52a propagates straight from the light source 52 into a display panel 14", but is collimated.

In order to diverge the light into the panel 14", a light receiving edge 14a" is made concave. The edge 14a" thereby functions as a cylindrical diverging lens which diverges the light into the panel 14" to a desired extent.

The principles of the embodiments of FIGS. 7 and 8 may be applied to provide a specified amount of vertical dispersion or distribution of the light emitted from the display panel 14' or 14" such as required by Federal standards. The vertical dispersion may be increased by making the light receiving edge of the panel concave (or less convex), and vice-versa.

EXAMPLE

A CHMSL 10 was constructed as illustrated in FIGS. 1 to 5. The display panel 14 was formed of acrylic plastic resin having an index of refraction $\eta_1 = 1.49$, whereas the light source 12 was a red light emitting diode array. The dimensions of the panel 14 were 25 cm in the Z-direction and 6.5 cm in the X-direction. The height of the light receiving edge 14a (in the Y-direction) was 1 cm. The panel 14 had ten steps 14d, with the height of the walls 14e each being 1 mm.

The panel 14 was slanted from the horizontal by an angle $\theta = 13°$. The angle $\alpha_1$ by which the walls 14e were cut back toward the edge 14a (also the angle of incidence of the light beam) was 26°, whereas the complementary angle $\beta$ was 66.4°. The angle of refraction $\alpha_2$ was $(\alpha_1 + \theta) = 33.6°$. The depressions 14f of the edges 14e had a radius of 2 cm and a width of 1 cm.

The CHMSL 10 emitted light with the peak direction being horizontal, and horizontal and vertical dispersion in excess of Federal standards.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A visual display device comprising:

light source means; and a display panel having a light receiving edge and first and second opposing surfaces extending away from said edge, said edge being positioned to be illuminated by said light source means;

the second surface being formed with steps having walls which are angled toward said edge such that light propagating through the display panel from said edge is refracted out of the display panel through said walls in a direction at least partially away from the first surface.

2. A display device as in claim 1, in which the second surface slants toward the first surface in a direction away from said edge.

3. A display device as in claim 2, in which:

the display panel is designed to be mounted with the second surface disposed above the first surface and said edge at an uppermost position such that the first surface is inclined relative to the horizontal by a predetermined angle; and said walls are angled toward said edge such that said light is refracted out of the display panel through said walls at substantially said predetermined angle relative to the first surface.

4. A display device as in claim 2, in which:

said light source means comprises a divergent linear light source; and said edge has a convex cross-section.

5. A display device as in claim 2, in which:

said light source means comprises a non-divergent linear light source; and said edge has a concave cross-section.

6. A display device as in claim 2, in which said walls are formed with a plurality of laterally spaced, curved light dispersing depressions.

7. A display device as in claim 6, in which:

said depressions have a predetermined width; and said depressions of each wall are laterally offset from said depressions of adjacent walls by approximately half the width of said depressions.

8. A display device as in claim 6, in which said depressions have substantially cylindrical shapes.

9. A display device as in claim 2, in which the first surface is substantially flat.

10. A display device as in claim 2, in which the first surface is concave.

11. A display panel comprising:

a light receiving edge; and first and second opposing surfaces;

the second surface being formed with steps having walls which are angled toward said edge such that light propagating through the display panel from said edge is refracted out of the display panel through said walls in a direction at least partially away from the first surface.

12. A display panel as in claim 11, in which the second surface slants toward the first surface in a direction away from said edge.

13. A display panel as in claim 12, in which:

the display panel is designed to be mounted with the second surface disposed above the first surface and said edge at an uppermost position such that the first surface is inclined relative to the horizontal by a predetermined angle; and said walls are angled toward said edge such that said light is refracted out of the display panel through said walls at substantially said predetermined angle relative to the first surface.

14. A display panel as in claim 12, in which said edge has a convex cross-section.

15. A display panel as in claim 12, in which said edge has a concave cross-section.

16. A display panel as in claim 12, in which said walls are formed with a plurality of laterally spaced, curved light dispersing depressions.

17. A display panel as in claim 16, in which:

said depressions have a predetermined width; and said depressions of each wall are laterally offset from said depressions of adjacent walls by approximately half the width of said depressions.

18. A display panel as in claim 16, in which said depressions have substantially cylindrical shapes.

19. A display panel as in claim 12, in which the first surface is substantially flat.

20. A display panel as in claim 12, in which the first surface is concave.

* * * * *